Figures 1, 2:
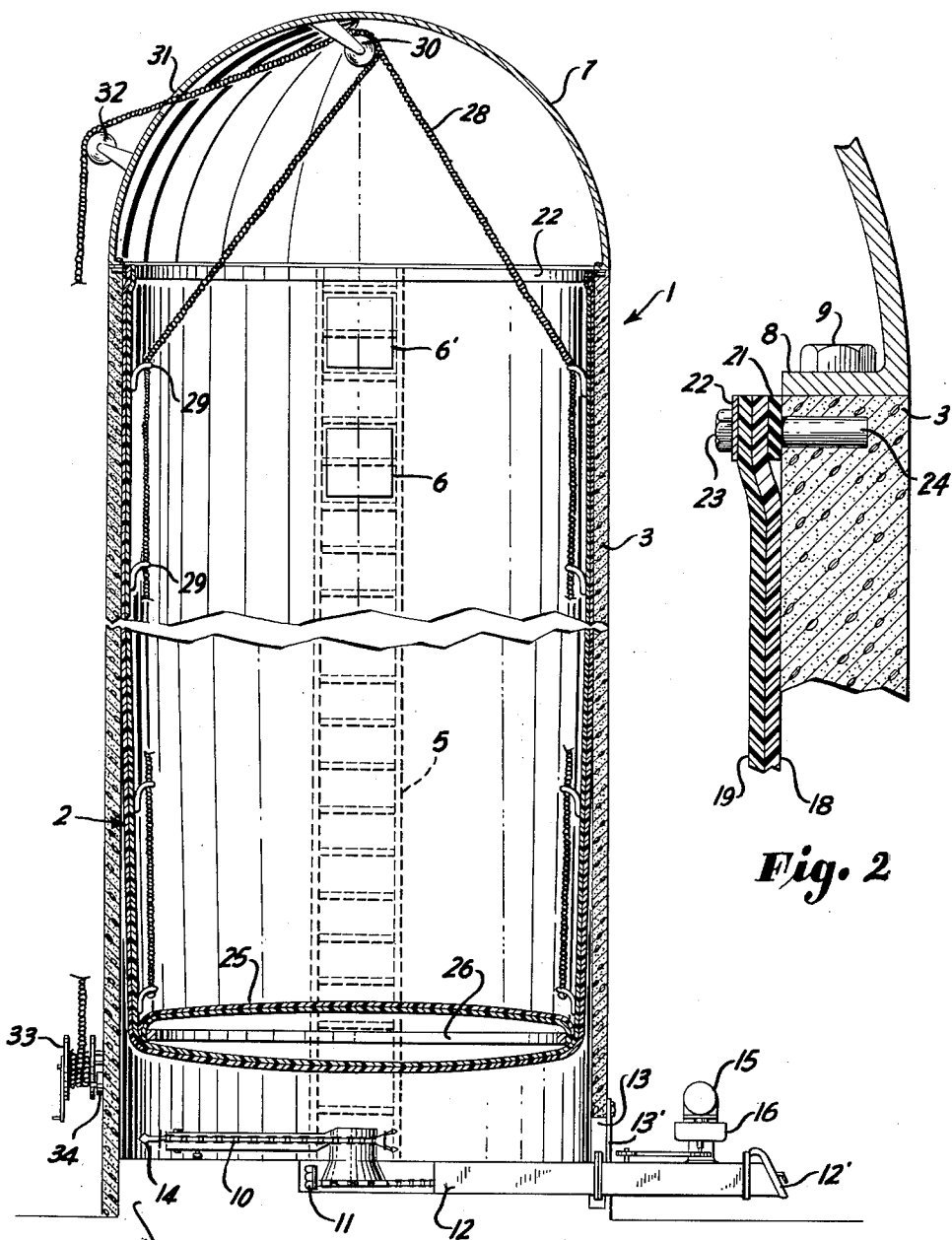

Jan. 16, 1962 P. H. BEACH 3,016,814
SILO
Filed June 10, 1959

INVENTOR
PAUL H. BEACH
BY
Bean, Brooks, Buckley & Bean
ATTORNEY 3,016,814
SILO
Paul H. Beach, P.O. Box 63, Merrill, Mich.
Filed June 10, 1959, Ser. No. 819,303
7 Claims. (Cl. 99—235)

This invention relates generally to the storing of forage materials, and more particularly to a new and useful silo construction.

When fresh plant material is compacted within a silo the living cells thereof continue to respire, which rapidly converts oxygen from air entrapped within the compacted mass into carbon dioxide, or carbonic acid. This conversion is substantially completed in a very few hours, and permits the development of molds which are unable to grow in the absence of oxygen. Acid forming bacteria then multiply enormously and attack the sugars present in the plant material, breaking them down into simple organic acids. The production of these acids is the most important change in the process of converting fresh forage crops to silage, because the resulting low pH prevents the growth of putrefactive bacteria which would rot the silage. When the pH reaches a certain point practically all fermentation stops, and if oxygen does not gain entrance into the compacted, fermented material it may be stored for extended periods of time with practically no decrease in quality.

However, whenever the silo is opened the surface of the compacted mass is thereby exposed to air, and the silage thereat will spoil. To keep ahead of such spoilage the silage must be removed from the exposed surface at a rate of from 2 to 4 inches each day. Therefore, the diameter of the silo customarily is determined by the amount of silage to be used daily, keeping in mind that from two to four inches of depth must be removed each day to keep ahead of spoilage. The height of the silo is therefore determined by the number of days in the feeding program using stored silage.

A silo that can be unloaded without exposing any surface of the material to the atmosphere is highly desirable, because a smaller amount of silage can be removed daily, or silage can be removed at less frequent intervals, without the danger of substantial spoilage. This permits the height, diameter and shape of a silo to be determined by cost of construction, rather than by the feeding program of the farmer, and in turn lends flexibility to the farmer's feeding schedule. Also, a substantially sealed silo enables all crops to be stored with a lower moisture content, thereby providing more food value per pound of silage. The relatively high (60–75%) moisture content of forage crops normally stored in silos prevents more than a few inches of air penetration, and thereby acts as a preservative against spoilage. In addition, some materials, such as shelled corn, which cannot as a practical matter be stored in conventional silos because of their relatively low moisture content, can be stored wet (25% or higher moisture content by weight) in a sealed silo.

Heretofore, materials such as corn customarily were dried, either in the field or artificially. If dried in the field, there is approximately a ten percent field loss and a late and relatively inefficient harvest. Also, the nutrient value of the stalks is lost. However, if the corn is stored wet, as it can be in a sealed silo, it can be harvested early and a winter cover crop can be planted. In addition, corn which is stored wet has a ten percent or higher food value than corn which is stored dry.

Silo constructions which remain substantially sealed even during unloading are known, but those which are commercially available are quite expensive, compared to silo structures generally and require a large investment beyond the reach of many farmers.

A primary object of my invention is to adapt a silo of any of a wide variety of known, relatively inexpensive constructions, so that the same can be unloaded substantially without exposing the surface of the stored material to the atmosphere during the unloading process.

Another object of my invention is to provide the foregoing in a relatively inexpensive and easily assembled construction which is both durable and dependable, and which provides for conventional silo loading and unloading procedures and means.

In accord with one aspect of my invention there is provided, in combination with a silo having normally substantially air-tight bottom and side walls, an access door into the upper end thereof for loading the same, and unloading means adjacent the bottom thereof, a flexible bag of substantially air impervious material secured adjacent its upper end to the silo in substantially air tight relation thereto, above the access door, the bag having a bottom wall normally resting on top of the stored crops and of a size and weight such that it lowers with the level of the stored crops as the later are unloaded, the bag being of a length such that its bottom wall is maintained clear of the unloading means, whereby the bag comprises a movable top wall of a substantially air-tight chamber, together with means for collapsing the bag upwardly when it is desired to load the silo.

The foregoing and other objects, advantages and characterizing features of a silo constructed in accord with my invention will become clearly apparent from the ensuing detailed description of a presently preferred, illustrative embodiment thereof, taken in conjunction with the accompanying drawing wherein like reference numerals denote like parts throughout the various views and wherein:

FIG. 1 is a vertical, sectional view through a silo modified in accord with my invention, parts being broken away for ease of illustration; and FIG. 2 is an enlarged fragmentary view of a detail thereof.

In the accompanying drawing there is shown a conventional silo, generally designated 1, incorporating the flexible, movable top wall of my invention, generally designated 2. Silo 1 can be of substantially any conventional construction, with that illustrated having a side wall 3 of concrete stave form on a foundation 4. The silo wall 3 and foundation 4 should be of sound construction and in a good state of repair, so as to be substantially air-tight. Also, the inner side of wall 3 and of doors 6 and 6' should be as smooth as possible, to reduce the abrasion on bag 2 and to permit the stored crops to fall in the silo as silage is unloaded from the bottom thereof. Silo 1 is equipped with a conventional exterior ladder 5, and with one or more access doors 6, all of which are permanently sealed so as to be air and moisture tight except for the top access door, illustrated at 6' in the drawing, through which crops to be stored are loaded into the silo. The silo also has a roof 7, which is secured in a conventional manner, as by a flange 8 resting on the top of the side wall 3 and bolted thereto as indicated at 9.

In a silo constructed or modified in accord with my invention, I contemplate unloading from the bottom. To this end, an unloading mechanism of suitable conventional design is positioned in the bottom of the silo, such mechanism comprising per se no part of my invention. One type of unloading mechanism suitable for the purpose is made and sold by A. O. Smith Corporation of Milwaukee, Wisconsin, and more fully illustrated and described in United States Patent 2,736,461 dated February 28, 1956. As illustrated in the drawing, such an unloader can comprise a cutter arm 10 disposed above an endless conveyor 11, which latter is disposed in a trough 12 extending outwardly beyond the side wall 3 of the silo through an opening 13 therein. Opening 13 is otherwise closed by a substantially air-tight door 13', and the end of trough 12 is normally closed by a door 12'. Arm 10 is provided with a plurality of cutters 14, and is designed to be rotated, and the conveyor 11 driven, by any suitable means such as a motor 15 through appropriate reduction gearing 16, the silage being cut away at the bottom of the silo and delivered to the exterior thereof through the trough 12. As noted above, such an unloading mechanism of itself is no part of my invention.

In accord with my invention, the upper end of the silo is closed by a flexible bag which completes an air-tight chamber for the storage of silage. Such a bag is generally designated 2 and preferably is of a synthetic plastic or rubber material. I contemplate a strong and durable bag which will last for several years and will withstand abrasion against the stored crops and against the inner wall surface of the silo, and which is both puncture and tear resistant. In addition, I desire a substantially temperature resistant material, that is to say one that will withstand a wide variation in temperatures, from very hot to very cold, without loss of its flexible, air and moisture impervious nature. Also, it should be of a material which is rot proof and resistant to bacterial action, which is chemically inert as far as silage acids, alcohols and the like are concerned, and which is readily repairable. Along with all of this, the bag must fold easily, and must withstand cracking where folded, and must be of a readily pliable and flexible nature. A bag having all of the foregoing characteristics is best provided by a multiple ply construction, the bag illustrated having two lamina 18 and 19, with the inner lamina 19 comprising for example a polyethylene film of ten (10) mils thickness, and the outer lamina 18 comprising for example a polyester film made by E. I. du Pont de Nemours and Co., Inc., Wilmington, Delaware, under the name Mylar, of approximately one (1) mil thickness.

The bag 2 is secured adjacent its upper end to the silo structure 1 above access door 6', this being expeditiously accomplished by securing the upper end of the bag to the inner surface of side wall 3 adjacent the upper end thereof, as illustrated in FIG. 2. To provide an air tight seal between the bag and the silo wall I first coat the wall with a mastic composition 21, against which the lamina 18, 19 are pressed, the seal being completed by a metal ring 22 held in place on the inner periphery of the bag and urged against the wall 3 by means of lag screws 23 engaging sinkers or anchors 24.

The bottom of bag 2 preferably is hollow, which is readily accomplished by an inner bottom wall 25, also of two-ply construction, the inner wall 25 being sealed to the remainder of the bag by heat welding or any conventional sealing arrangement. The hollow bottom is inflated, to slightly above atmospheric pressure, and both cushions the bag against the silage and causes the bag bottom to retain its desired shape and fall in the silo. Preferably, a metal ring 26 is carried within the hollow bottom wall, which adds weight to the bag and more particularly ensures maintaining the desired shape thereof.

The bag is of substantially the same shape as the silo. In size, the side wall diameter of the bag, at its upper end, is approximately the same, or slightly larger than, the diameter of the silo, while the bag bottom wall is of slightly smaller diameter than the silo so that it will fall freely therein. At the same time, the bottom wall of the bag is of sufficiently large diameter that it will tend to free any silage adhering to the silo wall. In its fully extended position, bag 2 is shorter than the silo, so that the bottom wall of the bag is at all times held out of contact with the unloading mechanism.

The inflated bag bottom, provides it with a degree of rigidity, such that it tends to fall evenly with the level of the silage as the latter is unloaded. For loading, the bag can be collapsed upwardly by means including a plurality of flexible ropes or other pull members 28 which extend through grommets 29 secured to the side wall of the bag at spaced points therearound, adjacent its upper end, adjacent the bottom wall, and at spaced points between the opposite ends thereof. The members 28 have a lost motion connection with grommets 29, except adjacent the bottom wall, and train around a pulley 30 affixed to the silo top 7 and pass out through an opening 31 and about a pulley 32 to a windless 33, which can be provided with a ratchet-pawl type of mechanism 34.

To install the bag of my invention in a silo, the silo is first rendered substantially air-tight at its bottom and side wall portions, being recoated or otherwise repaired as necessary. Then, the bag is collapsed and placed in the top of the silo, and the top of the bag is sealed to the top of the silo wall in permanent, air-tight engagement therewith as illustrated in FIG. 2. The pull members 28 are manipulated so as to retain the bag collapsed in the top of the silo, above door 6', until the silo is filled.

To complete the conversion, the silo is equipped with a bottom unloader, as shown.

The silo is filled through the top access door 6' and after the silo is filled the door 6' is closed and sealed, so as to be air and moisture tight. Ropes 28 then are released, leaving the bag free to unfold and lower as the level of the stored silage lowers. The bottom wall of the bag rests on the top surface of the silage, and the silage is unloaded from the bottom. As the level of silage drops the bag unfolds and occupies the space previously occupied by the silage.

Therefore, it is seen that bag 2 comprises a flexible, movable top wall of an air tight chamber containing the stored crops, which wall lowers as the level of stored crops lowers to provide an air tight chamber which is at all times of substantially no larger volume than the mass of compacted silage adhering to the inner wall surface of the silo, while at the same time the carbon dioxide generated by the silage tends to cushion the bag from both the silo wall and the silage itself. Should circumstances warrant, a pressure relief valve could be provided, either through the top access door 6' or elsewhere.

When it is desired to again load the silo, the ropes 28 are used to collapse the bag upwardly, and it will be observed that the bottom wall is collapsed upwardly first, being followed by the intermediate wall section and then the upper wall section, with the bag being collapsed upwardly to a point above the top access door 6' thereby enabling reloading of the silo. While only two pull members 28 are shown, for ease of illustration, it is believed that three such members equally spaced around the bag would be preferred. However, a still greater, and perhaps even a lesser, number of pull members could be provided, in any suitable arrangement.

Accordingly, it is seen that my invention fully accomplishes its intended objects, providing means for converting a conventional silo to one which is permanently substantially sealed, even during unloading, at relatively low cost. While only one form of my invention has been disclosed and described in detail herein my invention is not so limited, and variations therein and modifications thereof will occur to those skilled in the art without departing from the spirit of my invention or the scope of the appended claims. The conversion is easily accomplished, does not require access to the silo through the bag and provides a strong and durable bag of simple construction, and enables conventional loading and unloading of the silo.

Having fully disclosed and completely described my invention, together with its mode of operation, what I claim as new is:

1. A container for the storage of forage crops comprising, a normally upright supporting structure providing a storage chamber therein, said chamber having an unloading zone adjacent the lower end thereof, means defining an access opening through said supporting structure adjacent the upper end of said chamber for loading the same, a flexible bag of substantially air impervious material secured adjacent its upper end to said supporting structure in substantially air tight relation thereto at a point above said access opening, said bag having a bottom wall normally resting on the upper surface of crops stored within said chamber, said bag bottom wall being slightly smaller in size than the interior cross section of said chamber and free to follow the upper surface of such stored crops as the same is lowered, said bag being of a length maintaining its said bottom wall out of said unloading zone when said bag is fully extended, and means for collapsing said bag upwardly above said access opening when it is desired to load said chamber, said bag thereby providing a movable top wall for said chamber and said supporting structure providing normally substantially air tight side and bottom walls therefor.

2. A container for the storage of forage crops as set forth in claim 1, wherein said bag bottom wall is hollow and normally inflated.

3. A container for the storage of forage crops as set forth in claim 1, wherein said bag bottom wall is hollow and normally inflated, together with a ring member positioned within said bag bottom wall to maintain the desired diameter thereof.

4. A container for the storage of forage crops as set forth in claim 1, together with a ring member carried by said bag bottom wall for maintaining the desired diameter thereof.

5. A container for the storage of forage crops as set forth in claim 1, wherein said bag is of multiple ply construction having an inner lamina comprising a polyethylene film and an outer lamina comprising a polyester film.

6. A container for the storage of forage crops as set forth in claim 1, wherein said means for collapsing said bag upwardly comprise elongated flexible pull members having connection with said bag at spaced points therearound adjacent said bottom wall thereof and between said bag bottom wall and said upper end of said bag.

7. A container for the storage of forage crops comprising, a normally upright supporting structure providing a storage chamber therein, said chamber having an unloading zone adjacent the lower end thereof, means defining an access opening through said supporting structure adjacent the upper end of said chamber for loading the same, a flexible bag of substantially air impervious material secured adjacent its upper end to said supporting structure in substantially air tight relation thereto at said upper end of said storage chamber, said bag having a bottom wall normally resting on the upper surface of crops stored within said chamber, said bag bottom bottom wall being slightly smaller in size than the interior cross section of said chamber and free to follow the upper surface of such stored crops as the same is lowered, said bag being of a length maintaining its said bottom wall out of said unloading zone when said bag is fully extended, and means for collapsing said bag upwardly to said upper end of said chamber when it is desired to load the same, said bag thereby providing at all times substantially only a movable top wall for said chamber and said supporting structure providing substantially air tight side and bottom walls therefor.

References Cited in the file of this patent

UNITED STATES PATENTS

| | | |
|---|---|---|
| 1,275,148 | Friedlein | Aug. 6, 1918 |
| 1,451,171 | Mattson | Apr. 10, 1923 |
| 2,014,264 | Patrick | Sept. 10, 1935 |
| 2,074,959 | Guest | Mar. 23, 1937 |
| 2,722,171 | Deringer | Nov. 1, 1955 |
| 2,752,640 | Mazur | July 3, 1956 |
| 2,888,717 | Domitrovic | June 2, 1959 |

FOREIGN PATENTS

| | | |
|---|---|---|
| 1,018,834 | France | Oct. 22, 1952 |